Figure 1:
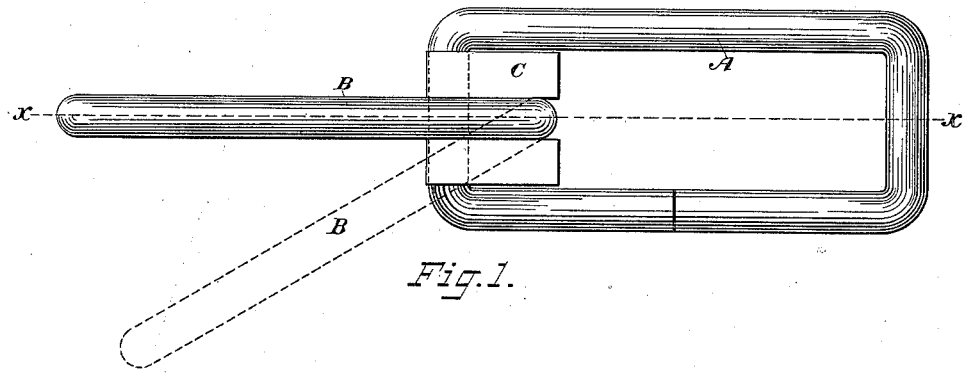

(No Model.)

J. M. DODGE.
CHAIN CABLE.

No. 363,216. Patented May 17, 1887.

Witnesses:
W. J. Graham
H. Hansen

Inventor.
Jas. M. Dodge.
By J. N. McIntire
Atty.

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

CHAIN CABLE.

SPECIFICATION forming part of Letters Patent No. 363,216, dated May 17, 1887.

Application filed March 5, 1887. Serial No. 229,741. (No model.)

*To all whom it may concern:*

Be it known that I, JAMES M. DODGE, of Philadelphia, in the county of Philadelphia and State of Pennsylvania, have invented a new and useful Improvement in Chain Cables; and I do hereby declare that the following is a full, clear, and exact description thereof, reference being had to the accompanying drawings, forming part of this application.

My invention relates to the construction of chain cables such as are used extensively for drive-chain and conveyer-chain purposes, and has especial reference to that species of chain cable patented to me September 12, 1882, No. 264,139, in which bearing-block or intermediate metallic pieces are employed between the links at the vicinities of their articulations for the purpose of affording larger bearing and wearing surfaces than are attainable in the use of links coupled directly with each other, all as will be found fully set forth in my said Letters Patent.

In the species of chain cables shown and described in my said patent the end bar at each end of each of the links is, however, substantially semicircular in contour, so that the semicircular bearing end of one link turns freely in contact with a correspondingly-shaped seat or groove in the bearing or friction block, that is so engaged with the adjacent end of the next link as to be prevented by the latter from turning with the first-mentioned link.

My present invention has for its object to provide for use in that species of chain cable the links of which are rectangular in contour interposed bearing or friction blocks, which will permit the perfect articulation of the parts of a chain of such species, and at the same time accomplish the great advantage of having the pintle-like ends of the rectangular links afford ample bearing-surfaces, so as to reduce the otherwise rapid wear of the articulations; and to this end and object my invention consists in the combination, with the rectangular links of a chain cable of the species just mentioned, of interposed bearing and wearing blocks formed with transversely-arranged straight grooves or seats at two opposite sides or faces of the blocks, adapted to receive and seat the straight end bars of the adjacent rectangular links in such manner as to permit said end bars to freely move in a pintle-like or hinge-like manner within the said grooves, all as will be hereinafter more fully explained, and as will be particularly pointed out and defined in the claim of this specification.

To enable those skilled in the art to which my invention relates to make and use a chain cable involving my present invention, I will now proceed to more fully describe the latter, referring by letters to the accompanying drawings, which form a part of this specification, and in which I have shown my improvement carried out in that form in which I have so far successfully practiced it.

Figure 2:
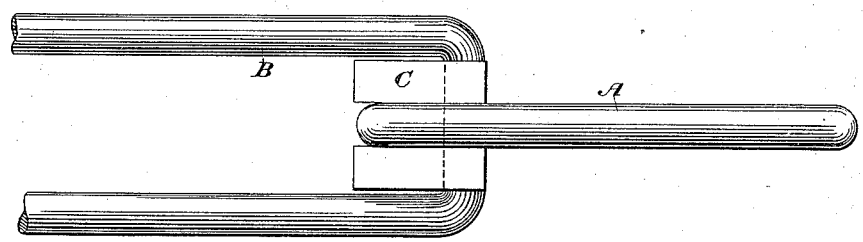
Figure 3:
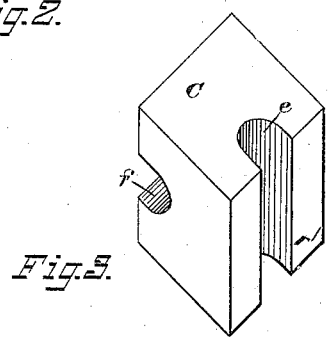
Figure 4:
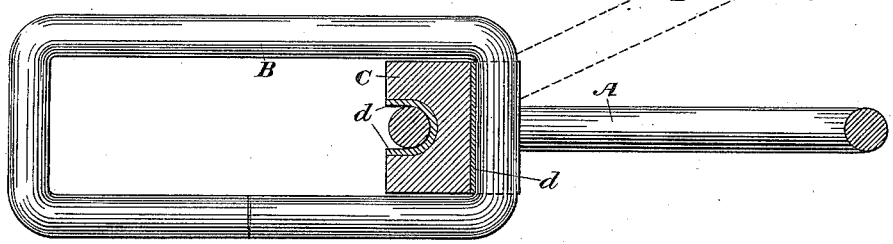

In the drawings, Figure 1 is designed to show two links of a chain made according to my invention in plan or top view. Fig. 2 is a partial side section of the same parts. Fig. 3 is a perspective view of one of the bearing or wearing blocks detached from the chain-links, and Fig. 4 is a vertical central section at the line $x\ x$ of Fig. 1.

In the several figures the same parts will be found designated by the same letters of reference.

A and B represent two similar rectangular links of the chain cable, and C one of the intermediately-arranged bearing or wearing blocks that are arranged at all the articulations of the chain, and through the medium of which the links are indirectly coupled together in such manner as to afford the requisite and usual degree of flexibility to the chain.

As clearly shown by the drawings, each one of the blocks C may be made substantially in the form of a solid cube, with grooves or seats $e$ and $f$ formed centrally in two opposite faces of the cube and in directions transverse to each other, so that, as shown, when in juxtaposition with the adjacent ends of two links, one of said links, B, will have one of its end bars accommodated in the bearing-groove $e$ of the block C, while the other link, A, will have one of its end bars similarly accommodated within the other groove, $f$, of said bearing-block. By this construction of bearing-block and its arrangement with the adjacent ends of the two links, as shown, either of the links may be vibrated about its housed end bar relatively to the friction-block C, as indicated by the changed position of one of the links shown in dotted lines in the drawings. It will be seen that by this arrangement of friction-blocks C, with rectangularly-shaped links A and B, the chain will comprise articulations of such a character that the wear of each end bar of each link will be distributed over the entire length of the end bar, so as to give much greater durability to the chain than is possessed by chain cables of the species shown and made according to the plan of construction common prior to my present invention.

It will be understood that by simply backing any two coupled link ends away from each other the friction-block C may be readily removed first from one and then from the other of the links for the purpose of any renewal of said blocks or for any other desired advantage. If found expedient, however, some simple and suitable means may be provided for temporarily holding these friction-blocks in place endwise of the chain relatively to either one or both of the links, so that when the cable is in an untaut condition the blocks may not be casually misplaced.

Of course the particular form of blocks shown is not indispensable to the operation of the novel contrivance shown, since, instead of being made perfectly cubical in shape, they might be of some other form and still retain their designed mode of operation in conjunction with the end bars of the cable-chain links.

If desired, each of the grooves $e$ and $f$ of the blocks C may be provided with a bushing or lining—such as seen at $d$, Fig. 4—of some different metal or material from that composing the block, for the purpose of getting a more durable wearing-surface between the block and the link, or for the purpose of rendering the parts capable of articulation with the slightest possible amount of friction.

What I claim as new, and desire to secure by Letters Patent, is—

The combination, with links A and B, which are substantially rectangular in form, or which, in other words, present straight end bars at their adjacent ends, of an interposed wearing or bearing block, C, formed or provided with suitable recesses or grooves, within which the end bars of the links are accommodated and in which they are free to turn, all substantially as and for the purposes hereinbefore set forth.

In witness whereof I have hereunto set my hand this 2d day of March, 1887.

JAMES M. DODGE.

In presence of—
  D. T. GROFF,
  D. E. KERN.